July 17, 1923.

J. BAUDOT 1,461,998

PUMP, COMPRESSOR, AND MOTOR

Filed Dec. 28, 1921

Inventor:
J. Baudot
By Lawrence Langner
Attorney

July 17, 1923.  
J. BAUDOT  
PUMP, COMPRESSOR, AND MOTOR  
Filed Dec. 28, 1921  
4 Sheets-Sheet 2  
1,461,998
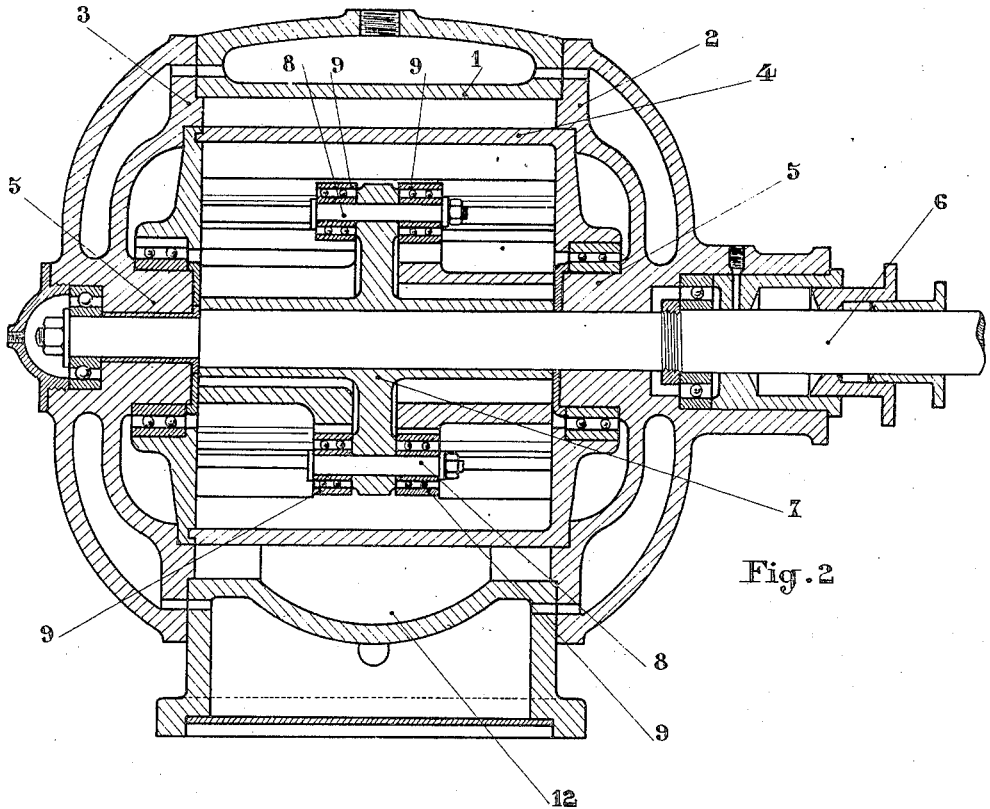
Fig. 2
Fig. 3
Fig. 4
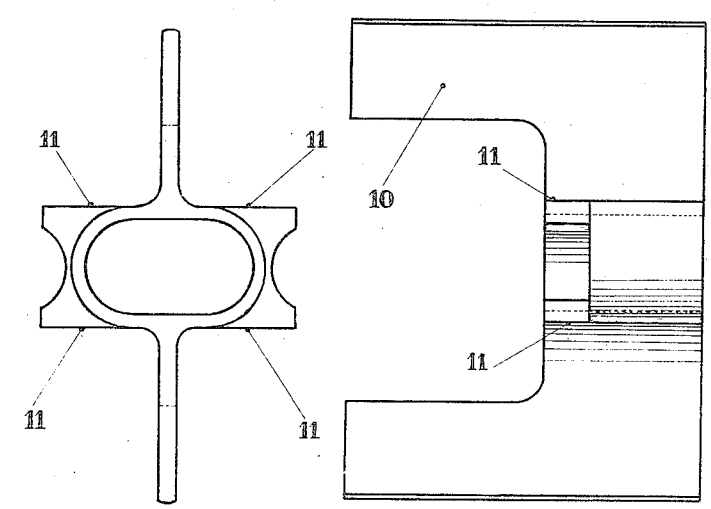
Inventor:  
J. Baudot  
By Lawrence Langner  
Attorney Patented July 17, 1923.                                                    1,461,998

UNITED STATES PATENT OFFICE.

JOSEPH BAUDOT, OF PARIS, FRANCE.

PUMP, COMPRESSOR, AND MOTOR.

Application filed December 28, 1921. Serial No. 525,893.

*To all whom it may concern:*

Be it known that I, JOSEPH BAUDOT, a French citizen, and resident of 4 Cite d'Hauteville, Paris, France, have invented certain new and useful Improvements in Pumps, Compressors, and Motors, of which the following is a specification.

The present invention relates to a rotary apparatus with controlled piston blades which is capable of serving either as a compressor and vacuum pump, or as a rotary motor for all fluids.

This apparatus is characterized by a particular arrangement of its members permitting of almost completely avoiding the frictional efforts of the piston blades whilst ensuring a regular delivery and, by reason of the arrangement of the whole apparatus, producing a progressive variation of the gaseous volume generated either by compression before its discharge, or by expansion or development according as to whether the apparatus is employed as a vacuum pump or compressor, or whether it is employed as a motor.

In the accompanying drawings.

Fig. 2 is a longitudinal section along the motor shaft.

Figs. 3 and 4 show respectively an end view and a side view of a double blade.

Figure 1:
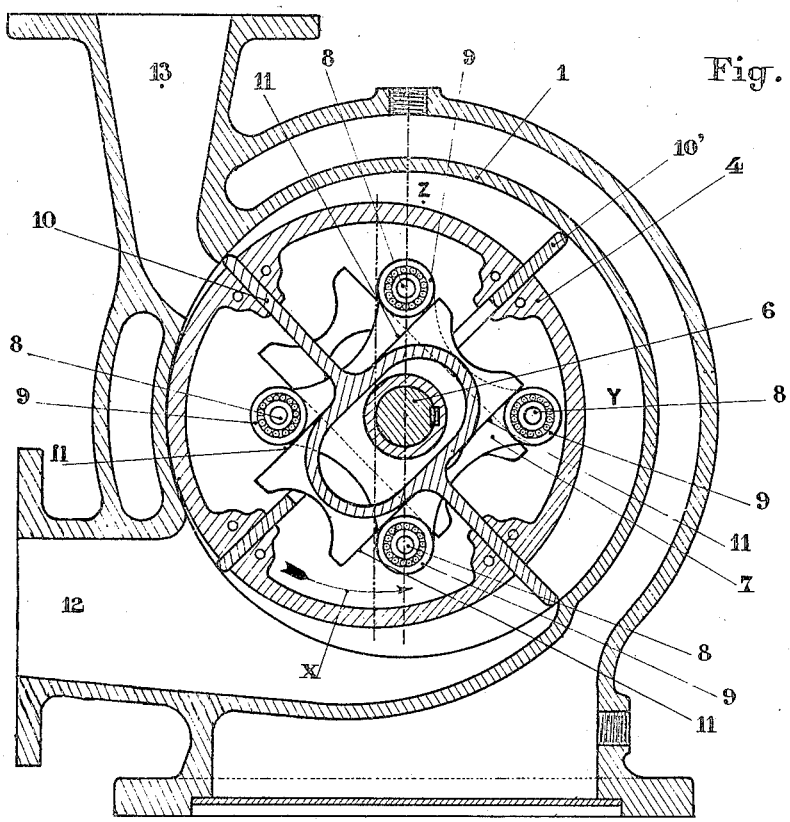
Fig. 1 is a cross section of the rotary apparatus with controlled piston blades.

The apparatus shown in Figs. 1 and 2 consists preferably of a pump casing 1 closed at the front and back by plates 2 and 3 and in which is mounted in such a manner as to be tangential to one of its genetrices, a cylindrical motor drum 4.

This drum rotates with slight friction in its bearings provided for this purpose on the inner surface of the closing plates 2 and 3. It rotates on bosses 5 and 5′ provided on the said plates and with respect to which they are arranged eccentrically.

A motor shaft 6 passes through the centre of the plate 2 and terminates in the plate 3 through which it may also pass in the case of the operation of a series of apparatus similar to that described. In the latter case the plate 3 is provided with a gland as indicated in connection with the plate 2.

Figure 5:
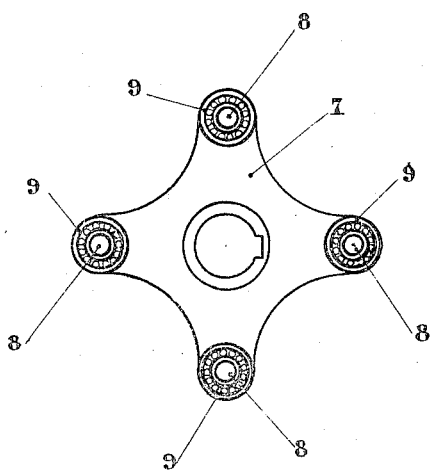
Figs. 5 and 6 show respectively a front view and a cross section of the controlling member for the blades.
Figure 6:
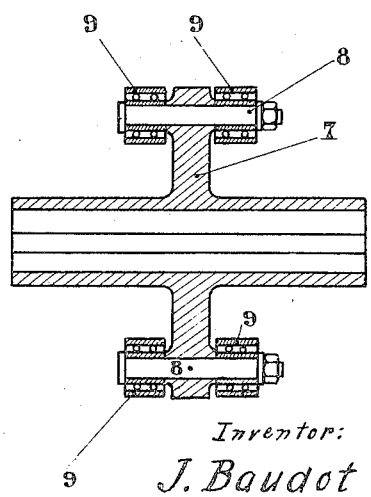

On the motor shaft 6 is secured a member 7 in the form of a star with four branches (Figs. 5 and 6) and provided with a sleeve by means of which it is secured upon the motor shaft. Each of the four branches of this star-member 7 has a stub shaft 8 passing through its end, which on either side of the branch is provided with a roller or ball bearing device 9.

These rollers, in the assembled apparatus bear against roller guides 11, 11 (Fig. 1) provided on double blades 10, 10′.

At their central portions the double blades are provided with an elongated aperture (Figs. 3 and 4) in order to permit of the passage of the motor shaft 6 and of the sleeve of the star member 7, and the roller guides are formed on this central portion. The double blades are at right angles one to the other and their actual blades engage with and can slide in openings or guides formed in the motor drum 4. It may be mentioned that the blade members are reduced at their central portion (Fig. 4) so as to permit of them being arranged at right angles as hereinbefore described.

A port 12 (Fig. 1) terminates in the interior of the pump body 1 a little below the point of a tangent to the drum. This port serves for the suction when the apparatus operates as a pump or compressor and as the outlet port when the apparatus operates as a motor.

A port 13 placed above the point of the tangent above referred to, serves as the outlet port in the case of a pump or compressor or even as the inlet port for the fluid in the case of a motor.

The port 12 extends sufficiently far into the interior of the body 1 whilst the port 13, on the contrary, is of such small dimensions that each end of the blades terminates at this latter port as near as possible to the tangential point. This arrangement of the ports has for its object a progressive change in the volume of the capacity formed between the body 1, the drum 4 and two successive blades, in such a manner that the gaseous fluid drawn in at 12 is slightly compressed before its discharge at 13 in the case of a vacuum pump or compressor. When, however, the apparatus operates as a motor the fluid enters at 13 and expands during its passage through the apparatus so as to leave the latter at 12 at a lower pressure.

The apparatus constructed as hereinbefore described operates in the following manner.

If the motor 6 is rotated in the direction of the arrow x it moves with it the star member 7. The rollers 9, 9 bear against the roller guides 10, 10' of the blades thus turning these, and these latter in turn rotate the drum in consequence of their engagement with the guides formed therein.

As the centre of the motor shaft 6 is disposed eccentrically, relatively to the centre of the drum 4, the blades 10, 10' are caused to slide in the said guides not by the friction of their ends against the inner wall of the pump body 1, but by reason of the combined movements of the member 7 and the motor drum 4 turning around different axes. The drum 4 serves as the point of support for the blades and only allows them to be moved along a line passing through the centre of the drum 4, whilst their alternate longitudinal movement in the guides of the drum is produced and limited by the rollers 9, 9 which drive them and which serve as their point of support.

From the foregoing it will be seen that no friction is produced between the ends of the blades and the inner wall of the pump body. It will also be seen that the volume enclosed between two blades reaches its maximum at Y and that this volume will be reduced in Z. This phenomenon will be produced four times at each revolution and the gases drawn in at 12 will be discharged in a reduced volume at 13.

If, however, the apparatus rotates in the opposite direction to the arrow x the fluid entering at 13 is expanded during its passage through the apparatus and will leave at 12 with a larger volume.

The fluid-tightness of the apparatus may be obtained either by means of oil serving for the lubrication thereof or by a liquid added for this purpose. In certain cases the liquid may be mercury.

In the case of a vacuum pump and a compressor the liquid expelled at the same time as the gases returns into the port 13 and ensures the fluid-tightness between the body of the pump and the motor drum.

In the case of operation as a motor, the ports may be so disposed as to obtain a better use of the liquid as a hydraulic seal.

The cooling of the apparatus is effected by the circulation of water through chambers provided for this purpose in the body of the pump and the closing plates.

It will be understood that by such an arrangement of the apparatus the effect of centrifugal force tending to drive the blades against the body of the pump is avoided by the point of support formed by the rollers 9, 9 which are directly connected to the motor shaft 6.

Figure 7:
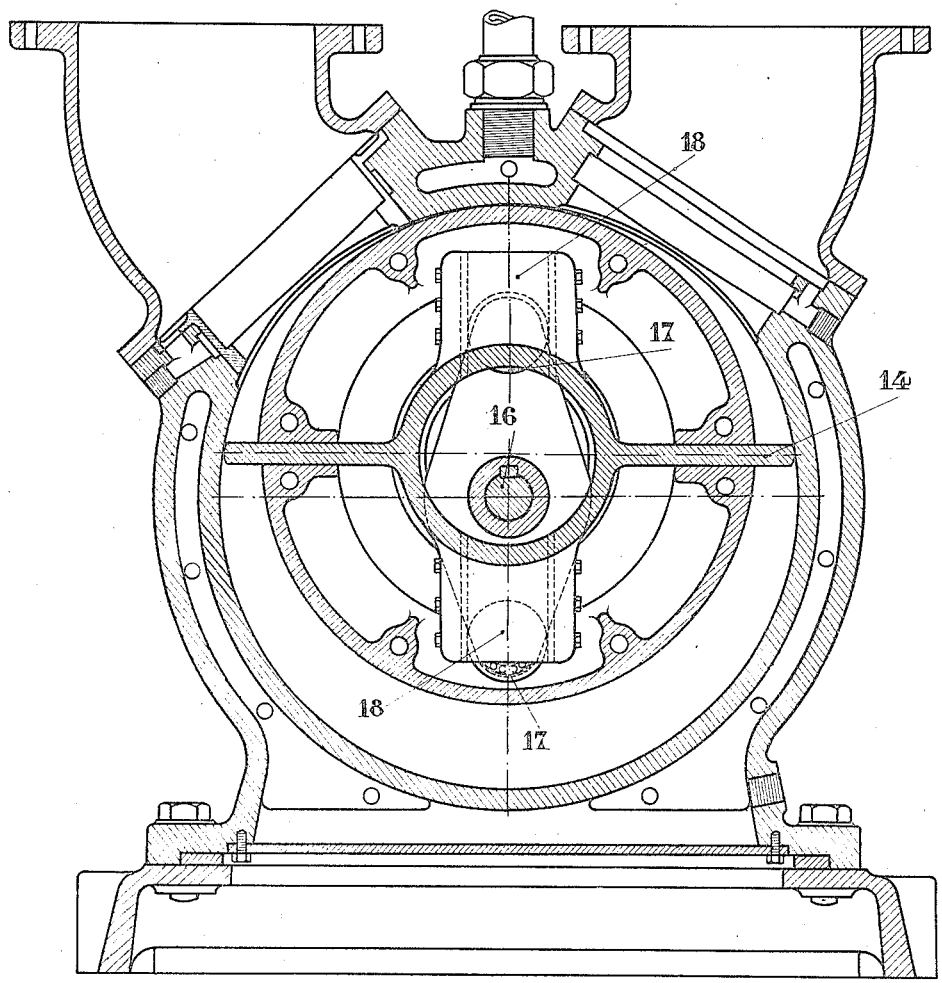
Figs. 7 and 8 show modified forms of the rotary apparatus.
Figure 8:
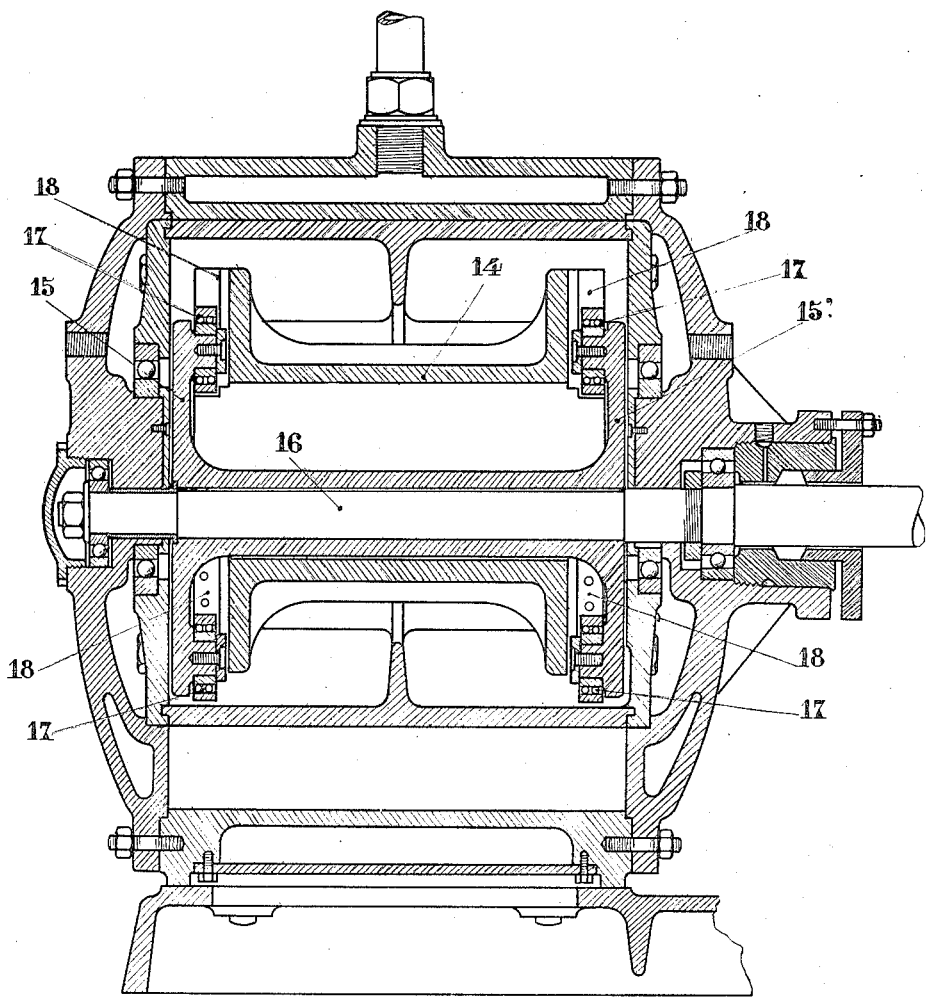

When the apparatus is adapted to operate simply as a vacuum pump or compressor at low pressure only a single double blade need be provided. This is the case in the modified form of construction illustrated in Figures 7 and 8.

The modification illustrated in these figures is provided with a driving mechanism consisting of two blade driving devices 15, 15' placed one on each side of the pump in the interior of the drum and keyed to the motor shaft 16.

These blade driving devices are provided at their ends with trunnions on which are mounted rollers or ball bearings 17, 17 engaging with roller guides 18, 18 formed on the double blade and arranged at right angles to the blades.

This modification ensures the same guiding movement for the blades and also frictionless operation as is obtained by the device illustrated in Figure 1.

It will also be seen that the ports are arranged at the top and that when the apparatus is to operate as a pump of low vacuum the inlet port is provided with a light valve which will be raised by a slight pressure of the gas in the interior.

In this case the port is placed as near as possible to the tangential point of the drum in the body of the pump in such a manner with the volume enclosed between one of the ends of the blade, the body of the pump and the drum will be reduced as much as possible so as to reduce the action of the atmospheric pressure on the surface of the blade on the charging side. When the apparatus operates with sufficiently low vacuums the valve will only be raised when the pressure of the gases enclosed between the blade, the body of the pump and the cylinder slightly exceeds the external pressure.

When the blade has uncovered the inlet port, the small quantity of gas remaining in the space formed between the blade, the body of the pump and the drum, near to the tangential point, expands into the larger space limited by the other blade. The internal pressure will then be considerably reduced on the surface of the blade on the charging side so that a considerable saving is effected in the power necessary for operation.

When the vacuum reaches the maximum the pump will only be raised very rarely, the difference in pressures existing on the two faces of the ends of the blades will decrease with the increase of depression obtained.

Having thus described my invention what I claim as new and desire to secure by Letters Patent is:—

1. A rotary fluid pump, compressor, or motor comprising a jacketed casing with inlet and outlet ports, a shaft centrally mounted in said casing, a drum eccentrically mounted in the casing, and rotatable therein, said drum being provided with peripheral guide slots, a bearing member having an opening for engagement over the shaft, oppositely disposed blades mounted on said bearing member, said blades being arranged radially in the drum, said bearing member having guide surfaces thereon, and a driving member keyed to the shaft for producing a radial movement of the blades and for turning the drum through the medium of the blades.

2. A rotary pump, compressor, or motor comprising a jacketed casing having inlet and outlet ports, jacketed end plates mounted at the ends of the casing, a driving shaft mounted centrally in said end plates, inwardly turned eccentric bosses on said end plates, ball bearings on said bosses, a drum with guide slots in its periphery eccentrically mounted in said casing and revoluble on said ball bearings, a plurality of double blades radially mounted in said drum and guided by said slots, a central connecting portion between each pair of oppositely disposed blades, said connecting portion having an opening therein to permit of the passage of the driving shaft and to permit of movement of the blades, a sleeve keyed to the driving shaft and passing through the slot in the connecting portion, radial arms secured to the sleeve, rollers mounted on said arms and engaging with said connecting portion, said rollers being adapted to move the blades radially outwards and also to turn them around the shaft.

3. A rotary pump, compressor, or motor comprising a jacketed casing having inlet and outlet ports, jacketed end plates mounted at the ends of the casing, a driving shaft mounted centrally in said end plates, inwardly turned eccentric bosses on said end plates, ball bearings on said bosses, a drum with guide slots in its periphery eccentrically mounted in said casing and revoluble on said ball bearings, a plurality of double blades radially mounted in said drum and guided by said slots, a central connecting portion between each pair of oppositely disposed blades, said connecting portion having an opening therein to permit of the passage of the driving shaft and to permit of movement of the blades, the blades being reduced in width at the middle portion thereof so that two pairs of blades may be arranged at right angles to one another, a sleeve keyed to the driving shaft and passing through the slot in the connecting portion, radial arms secured to the sleeve, rollers mounted on said arms and engaging with said connecting portion, said rollers being adapted to move the blades radially outwards and also to turn them around the shaft.

4. A rotary pump comprising, a casing having an inlet and an outlet port, a drive shaft centrally mounted therein, a bearing member positioned on said shaft and having oppositely disposed blades, a drum mounted eccentrically in the casing and having peripheral slots slidably receiving said blades, and an intermediate member keyed to the shaft and cooperating with said bearing member, whereby the intermediate member is driven by the shaft, and drives the drum, by means of the bearing member and blades.
JOSEPH BAUDOT.

Witness:
LEON FUANELDENT.